United States Patent
Smith

(10) Patent No.: US 7,407,474 B2
(45) Date of Patent: Aug. 5, 2008

(54) APPARATUS FOR CLEANING CONTAMINATED OIL

(75) Inventor: Robert Carrington Smith, Mount Louisa (AU)

(73) Assignee: Lubemaster Australia Ltd., Mount Louisa, Queensland (AU)

( * ) Notice: Subject to any disclaimer, the term of this patent is extended or adjusted under 35 U.S.C. 154(b) by 459 days.

(21) Appl. No.: 10/533,403

(22) PCT Filed: Oct. 29, 2003

(86) PCT No.: PCT/AU03/01424

§ 371 (c)(1),
(2), (4) Date: May 23, 2005

(87) PCT Pub. No.: WO2004/039922

PCT Pub. Date: May 13, 2004

(65) Prior Publication Data

US 2006/0003882 A1 Jan. 5, 2006

(30) Foreign Application Priority Data

Oct. 29, 2002 (AU) .............................. 2002952312

(51) Int. Cl.
*B04B 9/06* (2006.01)
*B04B 15/06* (2006.01)

(52) U.S. Cl. .............................. 494/49; 494/42; 494/61; 494/901

(58) Field of Classification Search .................. 494/24, 494/36, 43, 49, 61, 64, 65, 67, 84, 901, 42; 210/171, 232, 360.1, 280.1, 416.5, 380.1; 184/6.24

See application file for complete search history.

(56) References Cited

U.S. PATENT DOCUMENTS

| 2,335,420 | A | * | 11/1943 | Jones | 184/6.24 |
| 3,791,576 | A | * | 2/1974 | Bazil | 494/49 |
| 4,030,897 | A | * | 6/1977 | Pelzer et al. | 494/61 |
| 4,990,265 | A | * | 2/1991 | Tenthoff | 494/901 |
| 5,286,379 | A | * | 2/1994 | Jackson | 210/512.1 |
| 5,423,340 | A | * | 6/1995 | Campbell et al. | 494/901 |
| 5,611,363 | A | * | 3/1997 | Campbell et al. | 494/56 |
| 5,779,618 | A | * | 7/1998 | Onodera et al. | 494/5 |
| 6,017,300 | A | * | 1/2000 | Herman | 494/49 |
| 6,702,729 | B2 | * | 3/2004 | Mazzuca | 494/26 |
| 2001/0012814 | A1 | * | 8/2001 | May et al. | 494/24 |
| 2006/0003882 | A1 | * | 1/2006 | Smith | 494/49 |

FOREIGN PATENT DOCUMENTS

FR 2787118 6/2000

* cited by examiner

*Primary Examiner*—Charles E Cooley
(74) *Attorney, Agent, or Firm*—Shoemaker and Mattare

(57) ABSTRACT

Apparatus (10) for cleaning fluids such as oils comprising an inlet (12) for fluid to be cleaned, a heating unit (21) for heating the fluid, a centrifugal cleaner (24), a vacuum dehydration unit (26), a holding tank (11) and a fluid outlet (40). A first valve (13) controls communication between a first pump (20) and the inlet (12) or holding tank (11) to pump fluid from the inlet (12) or holding tank (11) to the heating unit (21) for conveyance to the centrifugal cleaner (24), the outlet of which is connected to the vacuum dehydration unit (26) and a second valve (37) controls communication between a second pump (35) and tank (11) and outlet (40) to either enable fluid to be recirculated back to the tank (11) or supplied to the outlet (40).

19 Claims, 5 Drawing Sheets

APPARATUS FOR CLEANING CONTAMINATED OIL

TECHNICAL FIELD

The present invention relates to purification of fluids and in particular to a method and apparatus for cleaning oils or other liquids.

BACKGROUND ART

In operation of machinery and other plant it is important to ensure the cleanliness and integrity of lubricating oils used. Lubricating oils can often be contaminated by water or moisture. Oil can also be contaminated by other substances or materials such as microscopic wear debris or contaminated by other liquids. Contamination of oil results in loss of lubrication integrity and can result in excessive wear of machinery and plant.

Different types of equipment are known for use in separation of solids from liquids. Centrifuges are a common form of device which can be used for this purpose and are of two general types, namely sedimentation centrifuges, which require a difference between the densities of the two or more phases to be separated; and centrifugal filters, in which the solid phase is supported and retained on a permeable membrane through which the liquid phase is free to pass. Self-powered centrifugal fluid cleaning devices are also known for cleaning lubricating fluids of solid contaminants in engines and like mechanisms. Notwithstanding the simplicity and efficiency with which such devices separate solids from the fluid passing therethrough, there are a number of limitations attached to their usage which have hither-to served to limit their widespread use.

Some centrifuges have draining limitations which can be reduced by exposing the centrifuge housing to an above-ambient pressure possibly from an engine crank case, although this then requires either a corresponding increase in supply pressure to maintain the pressure drop across the centrifuge rotor nozzles, acceptance of a reduced rotation efficiency, or by using a suction pump driven by way of a power take off from the engine or machine being lubricated by the circulated fluid. Another method proposed in the past to overcome the draining limitations of such centrifuges is to provide a cleaner in which a proportion of a circulated fluid is diverted with a drainage assistance arrangement including a venturi arrangement through which the non-diverted fluid is passed. The venturi develops a significant pressure drop in a region into which opens an induction port connected to the cleaner sump so that the cleaned fluid can be entrained into the non-diverted fluid and returned to circulation.

These arrangements have not been particularly effective in removal of the fluid from the base of the rotor. A failure to accomplish this effectively leads to the fluid "backing up" or accumulating in the base and this affects the rotor speed and therefore separation efficiency.

Devices and systems that have been used to remove water contamination include settling tanks or reservoirs, centrifuges, water absorbing filters, and vacuum dehydration oil purifiers. All these devices have significant limitations in either their water removal capabilities, ease of operation, capital costs, or operating costs. Some of these devices are ineffective in separating oil-water emulsions and are not capable of removing dissolved water. Centrifuges are effective in removing free water from the oil but are expensive and have limited capability in separating oil-water emulsions. Water absorbing filters are effective in removing free water but have a marginal effect in removing emulsified or dissolved water from the oil. In addition, water-absorbing filters have a limited capacity for water and are typically only used in applications where trace amounts of water are present.

Several types of vacuum dehydration oil purifiers have been used for oil dehydration. These generally operate under the principle of vacuum distillation, mass transfer of moisture from the oil to dry air, or a combination of the two. While vacuum distillation and mass transfer systems do remove free, emulsified and dissolved water, they have several drawbacks that have prevented their widespread use.

Vacuum purifiers are also subject to foaming within the vessels as water is vaporized within the oil. This foam has a lower specific gravity than the oil and can cause malfunctioning controls and a reduction in the performance of the purifier. Due to their ability to remove free, emulsified or dissolved water from oil, vacuum dehydration oil purifiers have become the desired method for water removal from oil. The drawbacks associated with vacuum oil purifiers have prohibited these purifiers from being widely used and/or the purifiers are not practical on the majority of lubrication or hydraulic systems. Because of their relatively large size and costs, they are limited to non-mobile, stationary applications, and are not practical for use on mobile equipment. Further due to their high capital cost, they are typically not permanently installed in a system unless it is a relatively large, expensive lubrication or hydraulic system. Instead, they are usually shared by several systems by using one to purify the oil on one machine or reservoir for a period of time, and then by moving it to another machine, etc. When the purifier is being used in this manner, the oil in the machines that are not connected to the purifier can become contaminated with water. This oil will remain contaminated until the purifier can be reattached to them and the oil dehydrated again.

Membrane based systems have been used to remove water from organic systems. It must, however, be recognized that the presence of either pores or defects in a membrane used for this purpose will result in the hydraulic permeation of the oil to the permeate side. This situation will result in the loss of oil. It will also allow the non-volatile oil to coat the permeate side of the membrane, thereby fouling the membrane and reducing its effectiveness in permeating water.

SUMMARY OF THE INVENTION

The present invention aims to provide a method and apparatus for fluid cleaning, which may at least partially overcome the abovementioned disadvantages or provide the consumer with a useful or commercial choice. The present invention in a further aspect aims to provide an improved centrifugal cleaner for liquids and liquid cleaning apparatus which incorporates a centrifugal cleaner. The present invention in yet a further aspect aims to provide an improved vacuum dehydration unit and a liquid cleaning apparatus which incorporates a vacuum dehydration unit.

The present invention thus provides in a first aspect, apparatus for cleaning fluids such as oils, said apparatus comprising an inlet for fluid to be cleaned, a heating unit for heating said fluid, a centrifugal cleaner, a vacuum dehydration unit, a holding tank, a fluid outlet, and means for conveying fluid from said inlet selectively through said heating unit, said centrifugal cleaner, and/or said vacuum dehydration unit and to said outlet or said holding tank.

The holding tank may be used at the discretion of the operator of the apparatus as may the heating unit. The individual components may be turned on and off at the discretion of the operator. The components may also be controlled to maintain pre-set optimum conditions within the system. The components may appear in the system in any order.

The present invention is particularly applicable to the treatment of oil as described further below however the apparatus may be used for treating a range of liquids.

A particularly preferred apparatus for treating oil such as to remove water from the oil moves oil from the holding tank through the heating unit, from the heating unit through the centrifugal cleaning unit, and from the centrifugal cleaner through the vacuum dehydration unit to remove the majority of water. The oil may then proceed from the vacuum dehydration unit back to the holding tank. In this configuration and as applied to cleaning of oil from a machine, provided the volume of oil to be cleaned is smaller than the holding tank volume, the entire volume of oil may be removed from the machine it lubricates into the apparatus for cleaning.

The system may preferably operate in a circulation pattern similar in nature to the dialysis of blood by the kidneys. Thus the oil may preferably be continuously circulated through the apparatus and returned to its origin as an ongoing process. Thus contamination of the oil may be diluted on each pass until a suitable level of cleanliness is achieved.

In a further aspect, the present invention provides a method for cleaning a fluid such as an oil, said method including the steps of heating said fluid, centrifuging said heated fluid, dehydrating said centrifuged fluid and selectively passing said dehydrated fluid to an outlet or subjecting said dehydrated fluid to further heating, centrifuging and dehydration through said steps.

Preferably the inlet for oil to be cleaned is connectable to a first pump. Suitably a suction strainer is provided in the inlet line. Preferably the first pump is also connectable to the tank. Connecting means may be provided for selectively connecting the first pump to the inlet or the holding tank. Preferably such means comprise a first selectively actuable valve which controls communication between the first pump and the inlet or holding tank. Thus by selectively actuating the first valve, the operator can determine whether the first pump pumps oil from the inlet or from the holding tank.

Means such as connecting pipes suitably connect the first pump to the heating unit and the heating unit to the centrifugal cleaner. The purpose of the heating unit is to heat the oil, creating a reduction in the viscosity of the oil thereby allowing the apparatus to be used to clean heavier grade oils. The heating unit may preferably be mounted after the first pump discharge to receive oil from the pump and allow the oil to pass through prior to entry to the centrifugal cleaner. The heating element of the heating unit may be a thermostatically controlled element and may also allow the operator to pre-set a temperature for optimum operation.

The centrifugal cleaner for cleaning oil may comprise a base, a rotor mounted on a substantially vertical axis for revolution thereabout, at least one rotor nozzle in a lower portion of the rotor, and a housing mounted on the base and enclosing the rotor.

The centrifugal cleaner most preferably includes an impeller positioned below the rotor adjacent the base to exert pressure on the oil. The oil cleaning centrifuge may include three sections—the centrifuge bowl or rotor, the driving nozzles and the oil level control mechanism or impeller, all contained in a suitable housing preferably manufactured of steel and cast aluminium.

Dirty oil to be treated such as may enter the centrifugal cleaner through the side of the centrifuge base and suitably travels up through a hollow spindle. The spindle may preferably be positioned at the axis about which the centrifuge bowl or rotor revolves. At the top of the spindle, a baffle may distribute the oil uniformly into the centrifuge bowl or rotor. The bowl spins at high speed, preferably about 7500 rpm, and the oil quickly accelerates to a high speed. The resulting centrifugal force causes dirt to move outward onto the inside bowl wall where it mats into a dense cake.

The impeller may suitably be an open type impeller or a shrouded impeller. Closed type or shrouded impellers are generally the most efficient. Open or semi-open types are used for viscous oils or for oils containing solid materials and on many smaller pieces of equipment. The impeller may perform as a turbine pump.

The impeller may preferably comprise a central hub rotating on the central axis around which the rotor is revolving. The hub may preferably have at least one blade extending therefrom. The blades may be straight, curved in either the forward or backward direction depending upon the position of the impeller (that is whether the impeller is located to push the oil or to suck the oil). The blades or vanes on the impeller may be angled or pitched. The pitch may be variable. The blades may partially overlap and define a plurality of passages between the blades. The pressure exerted on the oil may be due to centrifugal forces as in a centrifugal pump or of a positive displacement force as in a positive displacement pump.

The impeller may be provided with a loose inner sleeve to prevent tip leakage. The inner sleeve may be free to rotate under the frictional drag of the vanes and the viscosity of the oil. The impeller may preferably move the oil away from the base at a rate which is quicker than the flow from the nozzles. This may prevent or reduce the build-up of oil in the base which could cause the rotor to slow or lose efficiency.

The impeller may be attached to the rotor and if so the impeller may spin with the rotor. In this case the impeller may act as similarly to a pump impeller. The impeller may preferably be permanently fixed, screwed or cast to the base of the rotor. The inertia of the much larger and heavier rotor may preferably rotate the attached impeller. This impeller rotation together with the shape and configuration of the impeller blades preferably causes a sweeping action of the oil as it is ejected from the nozzles. The sweeping action may cause any oil contacting the blades to be directed into the drain sump away from the rotor. The impeller may suitably be smaller than the rotor so as not to unduly slow the rotor.

In another preferred aspect the impeller may be independent of the rotor. It may suitably be mounted on the same axis of rotation as the rotor and have blades shaped to utilize the force of the oil as it is ejected from the nozzles in order to impart rotational force on the impeller.

There may also be fins or vanes disposed in the base of the centrifugal cleaner to direct the oil away from the rotor. These vanes may guide the spent oil away from the rotor.

In another form, the invention resides in a centrifugal cleaner for cleaning oil or other liquids comprising a base, a rotor having an interior and an exterior mounted on a substantially vertical axis for revolution thereabout, at least one rotor nozzle in a lower portion of the rotor, the rotor having side walls arranged to retain solid contaminants contained in the oil which are forced outwardly by rapid rotation of the rotor due to reaction to ejection of the oil to a drain sump through the rotor nozzles, a housing mounted on the base and enclosing the rotor, a drain sump formed in the base below the rotor, an oil inlet passage arranged to supply oil at an elevated pressure to the interior of the rotor by way of the rotation axis, at least one oil drain passage in the base to receive oil from the drain sump and an impeller positioned below the rotor adjacent the base to exert pressure on the oil.

The vacuum dehydration unit for removing water from the oil for use in the apparatus may comprise a vacuum chamber having a base, an inlet in an upper portion of the vacuum chamber for oil entry, means for generating a vacuum in the vacuum chamber, a fluid or oil discharge passage in a lower portion of the vacuum chamber and extending a distance above the base of the chamber to maintain a depth of oil in the vacuum chamber.

The vacuum dehydration unit operates according to the principle that water boils at a lower temperature as pressure is reduced. The lower the pressure, the lower the boiling temperature. It is therefore possible to boil water contaminating oil or other substance with low relative volatility at temperature closer to ambient.

The boiling will preferably cause the formation of steam or water vapour which may then be condensed or coalesce inside the vacuum chamber and removed by the device creating the vacuum. The oil may be removed from the vacuum chamber by a combination of gravity flow, which may defy the vacuum and a pump associated with the oil discharge passage.

The result may be that any aqueous solution such as water and acids may be removed via the vacuum generating device and collected in a waste chamber for disposal or reuse. Water levels to less than 10 ppm may preferably be achieved in the oil. Most preferably oil for treatment in the vacuum dehydration unit is directly supplied from the centrifugal cleaner. For this purpose, the outlet of the centrifugal cleaner may extend into the vacuum chamber of the dehydration unit. Alternatively, oil may be supplied into the vacuum chamber via a nozzle supplied with oil under pressure. The flow of the oil under pressure to the nozzle may cause the oil to be atomised upon entry into the low-pressure environment inside the vacuum chamber.

The vacuum-generating device used in the vacuum dehydration unit may suitably be a small readily available air operated venturi vacuum jet unit. The vacuum dehydration chamber may have at least one tray or other means to increase the surface area of oil exposed to the vacuum. The trays may take the form of condenser trays to allow the oil vapour to condense back into oil. The trays may suitably be angled to allow the condensed oil to be directed towards the base of the vacuum chamber. The trays may have an array of openings therein to allow the oil to run through the openings.

The chamber may be of any shape suitable for use in a compact unit while still accomplishing its function. There may suitably be a means for measuring the extent of the vacuum formed in the vacuum chamber either inside or in association with the vacuum chamber. The chamber may have a second discharge outlet provided for the removal of water or water vapour from the vacuum chamber. There may be an accumulator associated with the second outlet. An internal baffle may extend into the oil maintained at the base of the vacuum chamber from an upper portion of the chamber thereby defining two areas within the vacuum chamber. The internal baffle may suitably be angled to allow the oil vapour on one side of it to condense on the angled surface and run down.

A second pump is suitably provided to carry oil away from the vacuum dehydration unit. Second connecting means may be provided for selectively connecting the second pump to the holding tank or outlet. The second pump may thus pump oil from the vacuum dehydration unit to an outlet or back to the holding tank for recirculation through the apparatus. Preferably the second connecting means comprises a second selectively actuable valve which controls communication of the second pump with the outlet or holding tank. A non-return valve may also be fitted to the discharge pipe from the vacuum chamber to prevent backflow. A final return filter may be provided in the outlet.

Each pump is suitably a separate pump driven by a motor suitably an electric motor. Alternatively, both pumps may be driven from a common motor. Each pump may preferably be a gyrotary pump. Pumps of this type generally have a small central gear rotating inside a larger annular gear causing the larger annular gear to rotate. These pumps also generally have larger than normal porting, enabling them to transport high viscosity oils. They preferably have a higher tolerance to wear from particle contamination than other types of hydraulic pump.

Most preferably the apparatus is portable. For this purpose, the components of the apparatus may be supported on a mobile chassis. The mobile chassis may be supported on wheels, at least one of which is preferably steerable.

BRIEF DESCRIPTION OF THE DRAWINGS

Reference will now be made to the following drawings which illustrate preferred embodiments of the invention. The embodiments have been described primarily in relation to the cleaning of oils. The apparatus of the invention however may be applied to cleaning a large range of liquids and thus the reference to oil should be taken as a reference to all liquids unless the context suggests otherwise. In the drawings.

DETAILED DESCRIPTION OF THE PREFERRED EMBODIMENTS

Figure 1:
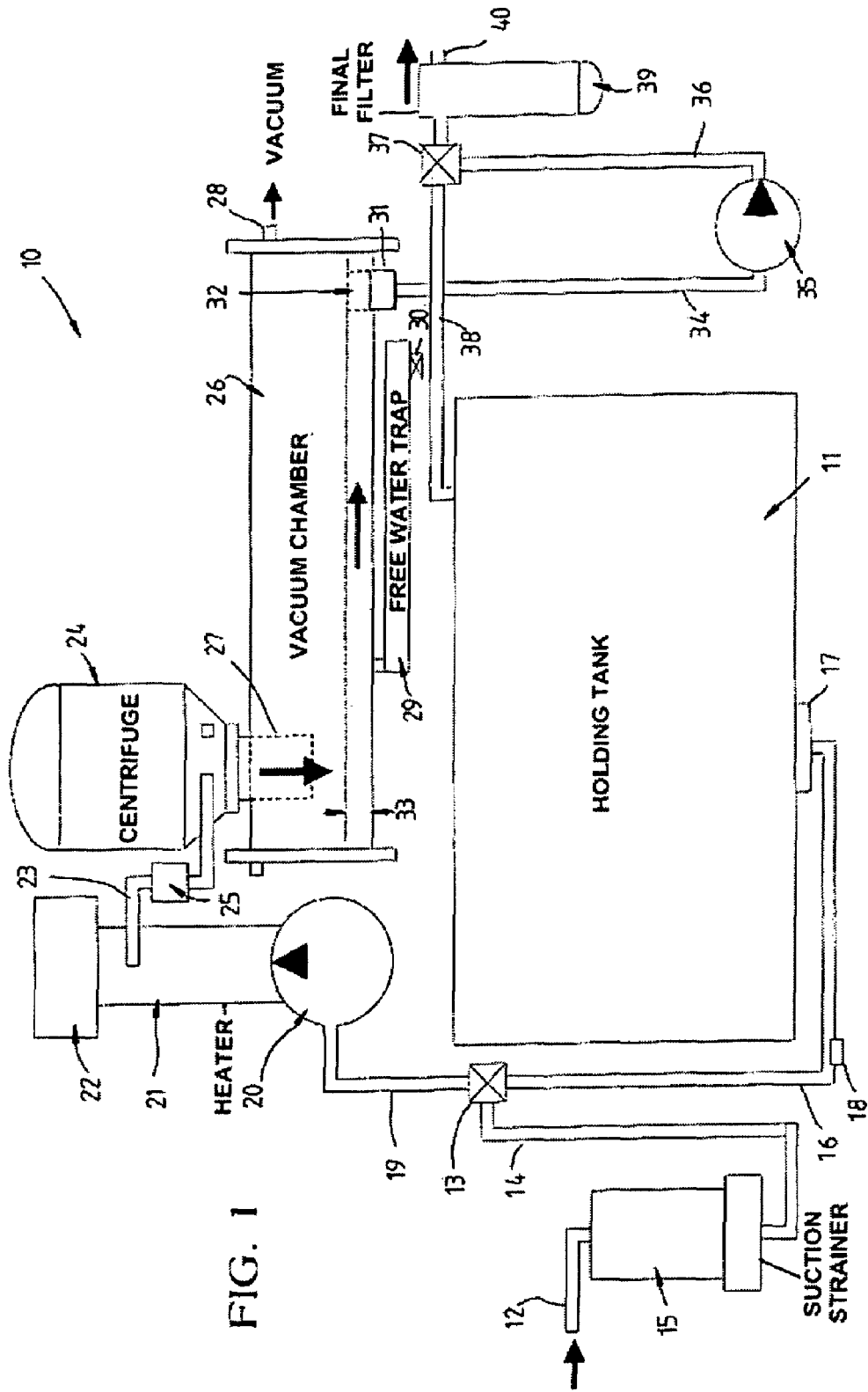
FIG. 1 is a schematic view of the oil cleaning apparatus according to an aspect of the present invention

Referring to the drawings and firstly to FIG. 1, there is illustrated schematically oil cleaning apparatus 10 according to an embodiment of the invention, the apparatus being adapted to clean either oil held within a holding tank 11 or oil supplied from an inlet pipe 12 which may be connected to an external source. A three way selector valve 13 is connected to the inlet 12 though a pipe line 14 via a suction strainer 15 which will remove larger particles and contaminants down to 25 μm size. The three way selector valve 13 is also connected to the holding tank 11 via piping 16 to a suction sump 17 located in a lower portion of the holding tank 11. The piping 16 includes a drain plug 18 which allows drainage of oil from the tank 11.

The outlet side of the valve 13 is connected by pipeline 19 to the inlet of a first pump 20 directly coupled to, to be driven by, an electric drive motor. The outlet of the pump 20 is coupled to an in-line heater 21 which has a thermostat and switching device 22 to control a preset heat or temperature in the heater 21. The heater 21 may be switched off so that no heat is provided to the fluid stream. The oil will usually passes through the heater 21 regardless of its state of activation.

The outlet of the heater 21 is connected through pipeline 23 to a centrifuge 24. An in-line particle counter 25 is provided in the pipeline 23. The centrifuge 24 is mounted directly on a vacuum chamber 26 of a vacuum dehydration unit such that oil is discharged from the base 27 of the centrifuge 24 directly into the chamber 26. The chamber 26 has a vacuum suction port 28 and is connected to a suitable vacuum source such as a venturi. A free water trap 29 is connected through the base of the vacuum chamber 26 to a lower portion of the chamber 26 by which free water within the cleaned oil in the chamber 26 can be removed. An outlet of the trap 29 is controlled by a valve 30.

The chamber 26 also has an oil outlet 31 which comprises a socket 32 which extends a distance 33 above the base of the chamber 26 to maintain a depth of oil in the chamber 26. Maintenance of this depth of liquid increases the surface are of the oil and promotes condensation of the oil. Pipeline 34 connects the outlet 31 to the inlet of a further pump 35 which is directly coupled to, to be driven by, a further electric motor. The outlet of the pump 35 is connected via a further pipeline 36 to the inlet side of a second three-way valve 37. The outlet side of the three ways valve 37 is coupled through pipeline 38 which comprises a tank return circuit line to the holding tank 11. The outlet side of the valve 37 is also connected via a final return filter 39 to an outlet line 40.

Figures 2, 3, 4:
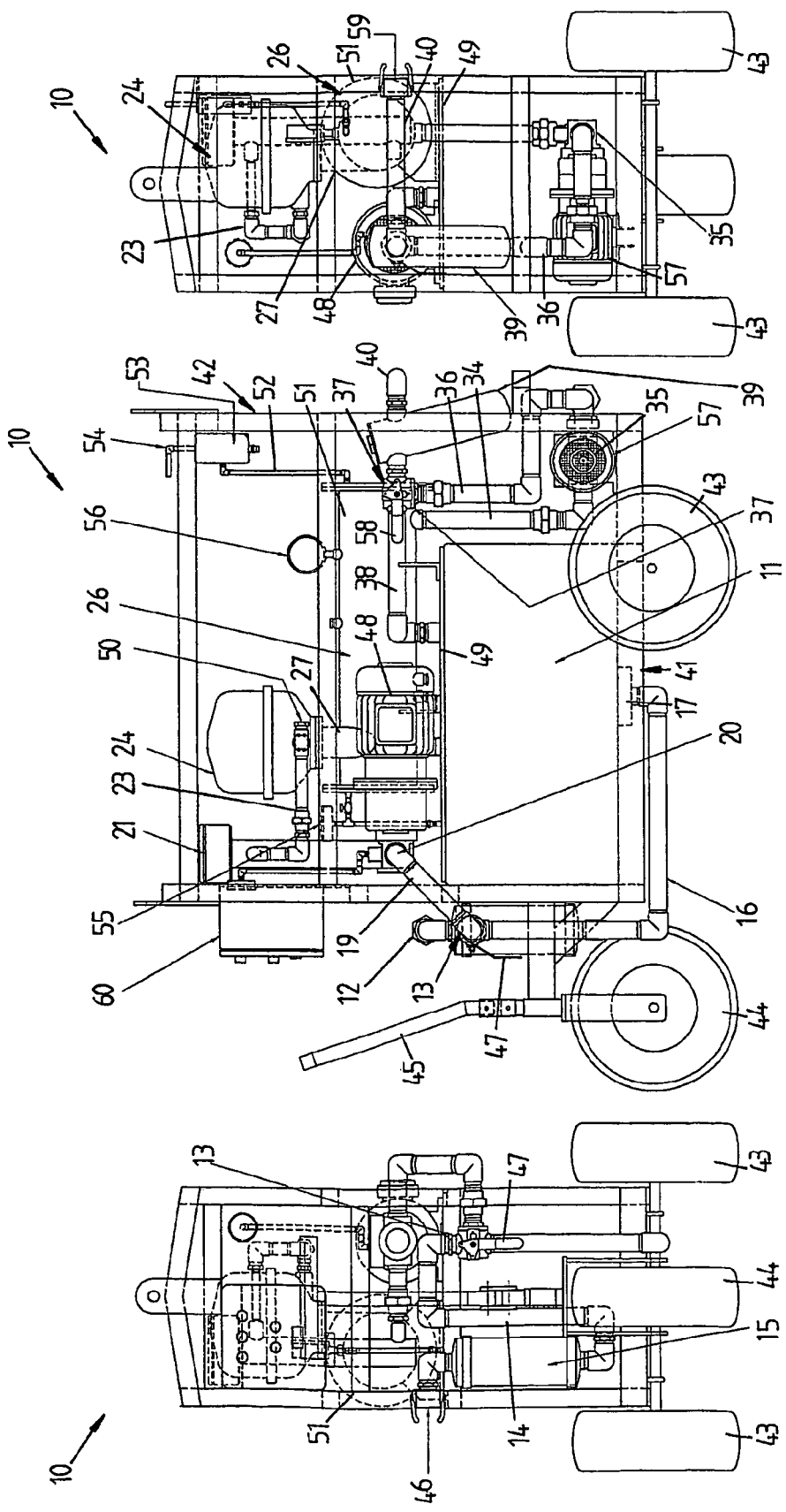
FIGS. 2, 3, and 4 illustrate in side elevation and opposite end elevations a practical embodiment of the oil cleaning apparatus of FIG. 1.

A practical embodiment of the above described apparatus is shown in FIGS. 2 to 4. The apparatus 10 comprises a portable oil cleaning apparatus with the components of the apparatus 10 mounted on a chassis 41 and upright frame assembly 42 mounted on or being part of the chassis 41, the chassis 41 being supported by a pair of rear wheels 43 and a front steerable wheel 44 which may be steered by a steering handle 45.

The tank 11 is mounted directly on the chassis 41 and extends substantially the full width of the chassis 41. The inlet filter 15 is disposed in an upright attitude and arranged forwardly of the tank 11 with the inlet 12 coupled to the upper end of the filter 15 extending to one side of the chassis 41 and being provided with a coupling 46 for coupling to an external liquid source. The lower end of the filter 15 is connected through pipeline 14 to the valve 13 which has a manual operating lever 47. Pipeline 16 extends downwardly from the valve 13 and beneath the chassis 41 to be connected to the sump 17 in the base of the tank 11. Pipeline 19 extends from the valve 13 to the pump 20 coupled to an electric motor 48 mounted on a platform 49 on the upper side of the tank 11.

The heater 21 is arranged in an upright attitude above the pump 20 to receive oil directly from the pump 20 with the outlet pipeline 23 from the heater 21 being connected to the inlet of the centrifuge 24 arranged in an upright attitude rearwardly of the heater 21. A temperature probe 50 may be provided in the pipeline 23 adjacent the centrifuge 24 to allow for monitoring of the temperature of oil supplied to the centrifuge 24.

The vacuum chamber 26 is defined by an elongated hollow tubular member or pipe 51 supported above the tank 11 and extending substantially horizontally. The base 27 of the centrifuge 24 extends into the chamber 26 to supply oil directly to the chamber 24. One end of the chamber 26 is connected through vacuum pipe 52 to an air operated vacuum pump 53 such as an air operated venture vacuum jet unit associated with a vacuum vent 54. The vacuum pump 53 operates to remove atmosphere and condensed water from the vacuum chamber 26. A vacuum breather 55 is also connected to the vacuum chamber 26 as is a pressure gauge 56 to allow monitoring of pressure in the vacuum chamber 26.

The outlet pipeline 34 from the vacuum chamber 26 extends downwardly from the chamber 26 to be connected to the inlet of the pump 35 which is connected to an electric motor 57 supported on the chassis 41 rearwardly of the tank 11. The pipeline 36 from the outlet of the pump 35 extends upwardly to the three-way valve 37 which may be manually operated by a lever 58. The valve 37 is supported above the tank 11 and the return pipeline 38 from the valve 37 is connected to the top of the tank 11. The valve 37 is also connected via the final filter 39 to the outlet pipeline 40 which terminates in a discharge connector 59 at the rear of the apparatus 10.

An electrical control box 60 at the front of the chassis 41 contains switches and other controllers which allow the operator to control operation of the pump electric drive motors 48 and 57 as well as the heater 21 and vacuum pump 53 for establishing a vacuum in the chamber 26.

The apparatus 10 may be used for either cleaning dirty oil charged into the tank 11 or for cleaning oil from an external location by coupling the source of oil to be cleaned to the apparatus 10 through a pipe connection to the inlet coupling 46. For this purpose, the operator through manual operation of the valve 13 connects the pump 20 to the inlet line 12 or the tank 11 and then starts operation of the pumps 20 and 35, the heater 21 and vacuum pump 53.

Operation of the pump 20 causes oil from the inlet 12 or tank 11 to be pumped to the heater 21 which after passing through the heater is pumped into the centrifuge 24. Oil exiting the centrifuge 24 passes directly into the vacuum chamber 26 where it is subject to dehydration with cleaner oil collecting in the bottom of the chamber 26 with free water being drained off through the free water trap 29.

When oil reaches or is above the level 33 in the vacuum chamber 26, it is pumped from the chamber 26 by the pump 35 driven by the motor 58. The operator 37 by manual operation of the valve 32 can determine whether to return the oil back to the tank 11 for further cleaning or to pump the cleaned oil out of the apparatus 10 through the filter 39 and outlet line 40.

The apparatus 10 functions so that any of the three main processes (vacuum dehydration chamber 26, oil centrifuge 24 and heater 21) can be operated at the discretion of the operator. The processes may be activated or deactivated at any stage. The system 50 may allow the oil to proceed through all three processes or any combination thereof. The pumps 29 and 35 are provided to allow the transport of the oil into the system, out of the system and around the system and the valves 13 and 37 may be operated to allow the apparatus 10 to operate as an in-line system or a re-circulating system treating oil stored in the holding tank 11.

Whilst oil exiting the heater 21 usually enters the centrifuge 24 directly, the apparatus 10 may be configured such that the oil from the heater 21 is diverted to enter the vacuum chamber 26 directly. The stream however may be split with portions of oil from the heater 21 entering both centrifuge 24 and chamber 26. Alternatively, oil exiting the vacuum chambert 26 may directed by the pump 35 to the centrifuge 24 or be returned to the holding tank 11 whilst oil exiting the centrifuge 24 may also be returned to the holding tank 11. Oil remaining at the lower portion of the holding tank 11 may be drained through drain outlet to be expelled from the apparatus 10 or as stated above recirculated through the apparatus 10 for further cleaning.

Figure 5:
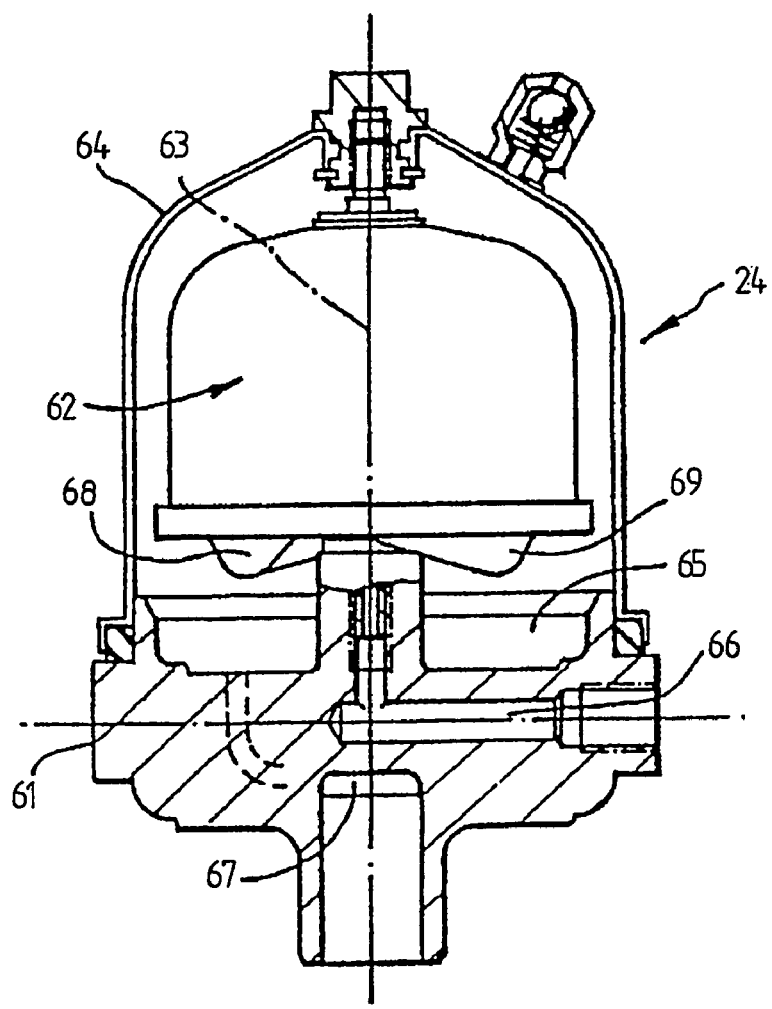
FIG. 5 is a part sectional elevation of a self-powered centrifugal cleaner for use in the apparatus of FIGS. 2 to 4.

Referring now to FIG. 5 there is illustrated in part sectional elevation a typical form of self-powered centrifuge 24 for use in the apparatus comprising a base 61, rotor 62 mounted on a substantially vertical axis 63 for rotation thereabout, a housing 64 mounted on the base and enclosing the rotor 62 and a drain or holding sump 65 formed in the base below the rotor 62. A fluid inlet passage 66 is arranged to supply fluid at elevated pressure to the interior of the rotor by way of the rotation axis and a fluid drain passage 67 in the base 61 receives fluid from the drain sump 65. The centrifuge 24 is mounted such that the drain passage 67 extends into the vacuum chamber 26 where by the outlet from the centrifuge 24 passes directly into the chamber 26. The rotor 62 has side walls arranged to retain solid contaminants, contained in the supplied fluid, which are forced outwardly by rapid rotation of the rotor due to reaction to ejection of the supplied fluid to the drain sump by way of rotor nozzles 68, 69 in the base thereof.

Figure 6:
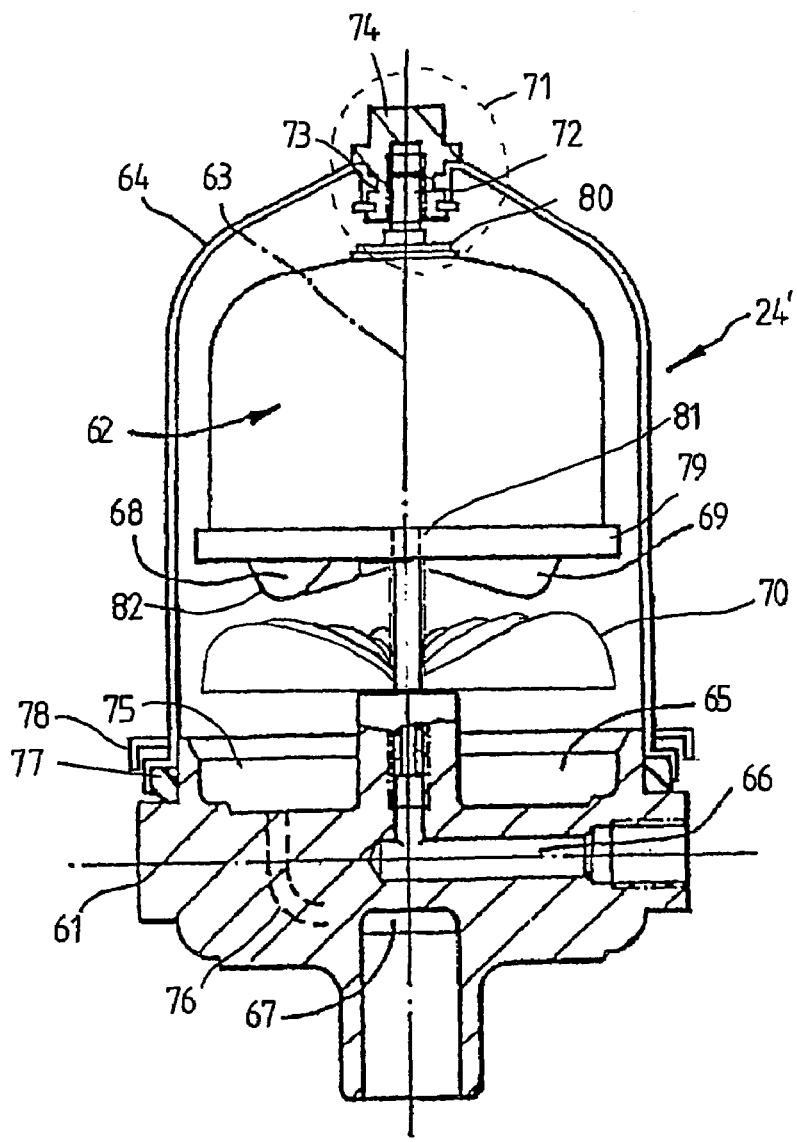
FIG. 6 is a part sectional view of a further form of centrifugal cleaner according to an aspect of the present invention.

FIG. 6 illustrates an alternative form of centrifuge 24' for use in the apparatus 10 and in which like components to the components of the centrifuge 24 of FIG. 5 have been given like numerals. As above, the centrifuge 24' comprises a base 61, a rotor 62 having an interior and an exterior mounted on a substantially vertical axis 63 for revolution thereabout and two rotor nozzles 68, 69 in a lower portion of the rotor 62. The rotor 62 has side walls arranged to retain solid contaminants contained in the fluid which are forced outwardly by rapid rotation of the rotor 62, the rotation being due to reaction to ejection of the fluid to a drain sump 65 through the rotor nozzles 68, 69. A housing 64 is mounted on the base 61 and encloses the rotor 62. The drain sump 65 is formed in the base 61 below the rotor 62, and a fluid inlet passage 66 is arranged to supply fluid at an elevated pressure to the interior of the rotor 62 by way of the rotation axis 63. At least one fluid drain passage 67 is provided in the base 11 to receive fluid from the drain sump 65 and an impeller 70 is positioned below the rotor 62 adjacent the base 61 to exert pressure on the fluid. The impeller 70 is connected to the rotor 62 (as shown in dotted outline) for rotation therewith.

As shown in FIG. 6, the housing 64 is essentially bell-shaped with a fixture 71 at the top of the housing to allow the spindle 72 disposed along the central vertical axis 63 to be inserted therein. The housing 64 is manufactured from a strong but relatively lightweight material such as stainless steel and it will generally be polished on the inner surface to reduce the friction between it and the fluid to be cleaned. The housing 64 is located relative to the base 61 by positioning an opening 73 disposed in an upper portion of the housing 64 over the protruding spindle 72 and securing the housing 64 in that position. The interior of the housing 64 may also have circular spacer members for maintaining the position of the rotor 62 within the housing 64 even when the rotor 62 is revolving at a high rate.

The spindle 72 is also the entry point for oil at an elevated pressure usually in the region of 100 psi into the centrifuge rotor 62. The oil enters the spindle 72 through a fluid inlet passage 66. The spindle 72 is a hollow elongate cylindrical member. It is manufactured from polished metal to reduce friction and wear to both itself and the centrifuge rotor 62. The spindle 72 is fixed to the base 61 so that the housing 64 and the rotor 62 may be lifted from the spindle 72 for disassembly. An upper portion of the spindle 72 is engaged by a nut 74 or other device to clamp the housing 64 in position.

The base 61 is generally bowl shaped to allow the collection of the cleaned fluid and the direct this fluid towards the outlet 67. The base 61 includes a number of directing fins 75 to contribute further to the direction of the fluid to the outlet or fluid drain passage 17. The base 61 is manufactured in a single piece and may be cast. The base 61, as with the other centrifuge components, is manufactured from polished metal to reduce friction between itself and the fluid to be cleaned.

There are two opposed fluid drain passages 76 in the base 61 (only one of which his shown) located on opposite sides of the spindle 72.

The housing 64 and the base 61 fit together with a substantially fluid tight seal to prevent or minimise leaks. A gasket 77 is used to enhance the seal. A collar 78 may also be used to further improve the sealing characteristics, the collar 78 being of annular form and fitting over enlarged portions on the housing 64 and the base 61 to maintain the seal.

The rotor 62 is generally tubular and cylindrical in design and is manufactured of stainless steel. The rotor 62 has a laterally extending portion 79 towards the base of the rotor 62 to correctly position it within the housing 64 even when revolving at high speed. The base of the rotor 62 and the upper portion of the rotor 62 have upper and lower aligned openings 80 and 81 therein to engage with the spindle 72 extending from the base 61. The openings 80 and 81 are fitted with bearings to reduce the friction between the rotor 62 and the spindle 72. The openings 80 and 81 are situated in the centre of the upper and lower portions of the rotor 62.

There are two nozzles 68 and 69 diametrically opposed on the base of the rotor 62. The nozzles 68 and 69 are oriented relative to the spindle 72 in order to provide the optimum amount of rotational force to the rotor 62. Each nozzle 68 and 69 is associated with a cowling 82 which is streamlined to provide lowered resistance in relation to the fluid when the rotor 62 in spinning.

Figure 7:
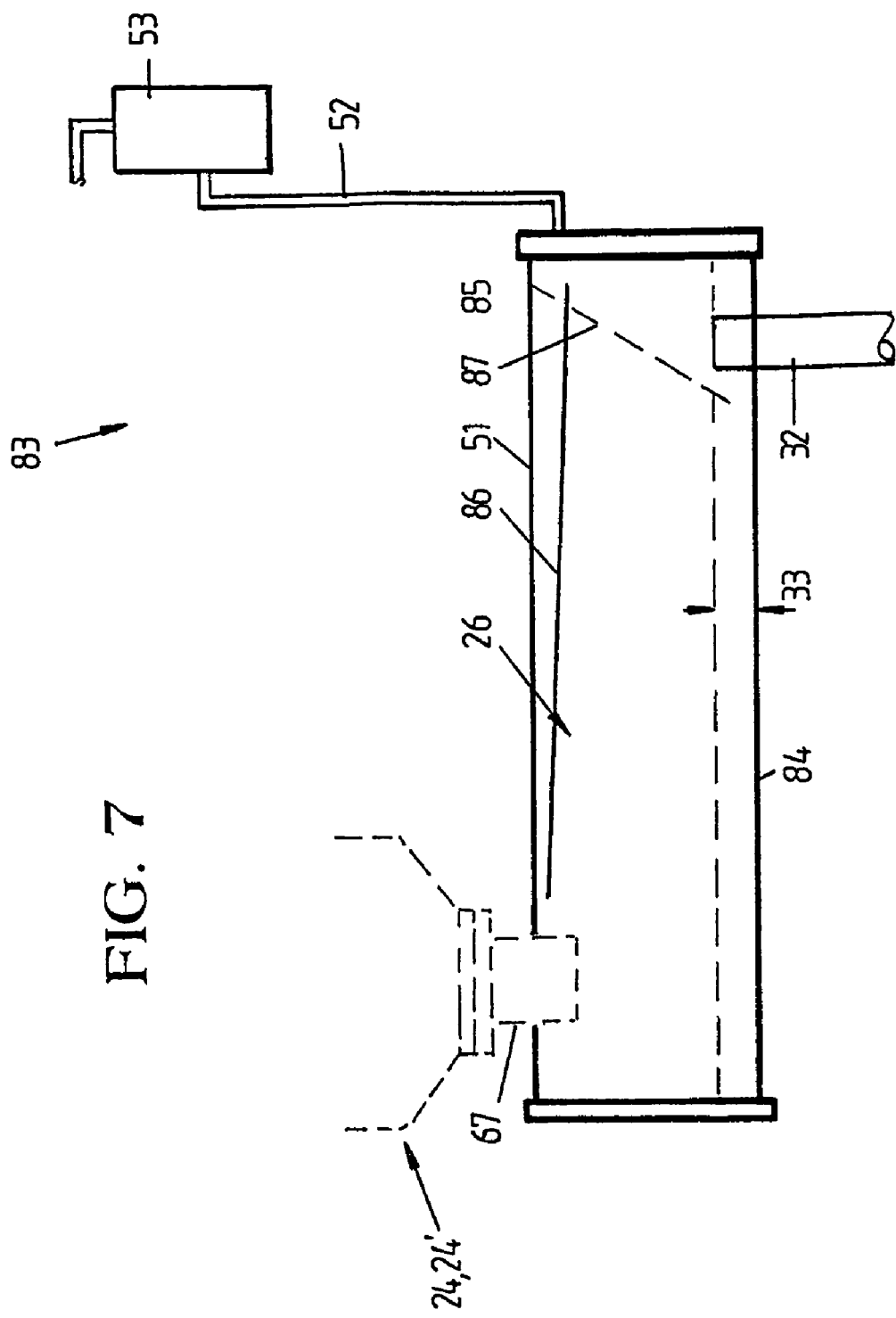
FIG. 7 is a schematic of the vacuum dehydration unit according to an aspect of the invention.

The vacuum chamber 26 of the apparatus 10 as shown in FIG. 7 is part of a vacuum dehydration unit 83 for removing water from the oil being treated. The vacuum chamber 26 as stated above is defined by a generally hollow tubular member or pipe 51 which is closed at each end and which is substantially sealed to prevent the ingress of any atmosphere which would give rise to an increase in pressure. The outlet 67 of the centrifuge 24 or 24' extends into an upper portion of the tubular member of pipe 51 and is sealed thereto and supplies oil directly to the chamber 26. The chamber 26 as described is connected via pipeline 52 to a vacuum-generating device 53. A fluid outlet 32 extends through the base 84 of the chamber 26 extending a distance 33 above the base 34 to maintain a depth of fluid in the chamber 26. All penetrations of the chamber 26 are sealed to the chamber 26 to maintain the low pressure environment.

The vacuum or lowered pressure environment is maintained in the chamber through the action of a vacuum generating device 53 which is a small, readily available air operated venturi vacuum jet unit. The vacuum-generating device 53 operates through an outlet 85 to remove atmosphere and also condensed water from the vacuum chamber 26. The vacuum generating device 53 may be associated with a waste collection chamber in which wastes can be collected.

The oil or other fluid enters the vacuum chamber 26 from the centrifuge outlet 67 and the water in the oil boils at a lowered temperature due to the lower pressure in the vacuum chamber 26. The more volatile oil generally does not boil. The water vapour makes its way towards the vacuum discharge regions of the vacuum chamber 26 and the oil towards the base 84 of the vacuum chamber 26.

The depth of oil maintained in the chamber 26 and defined by the outlet 32 extending into the chamber 26 increases the surfaces area of the oil to promote the condensation of the oil. A water condenser tray 86 in the uppermost portion of the chamber 26. Water in the oil which vapourises when the oil boils condenses on the tray 86. This tray 86 is also angled or inclined to guide the water towards the connection 85 of the vacuum generating device 53 and for removal by suction.

In an alternative arrangement, oil may enter the chamber 26 through a nozzle in an upper portion of the vacuum chamber which is designed to atomise the oil upon introduction into the low pressure environment. The atomised fluid increases the surface area of the water in the oil.

In a further alternative arrangement, an internal baffle 87 shown in dotted outline may be provided in the chamber 26 extending downwardly from an upper wall thereof towards the base 84 and into the fluid or oil at the level 33. The baffle 87 thus defines two areas within the vacuum chamber 26. The baffle 87 separates the chamber 26 into a liquid discharge area on the side of the outlet 32 and a condensing area on the opposite side. Any oil that remains as atomised oil cannot pass into the discharge area of the chamber 26 being blocked by the baffle 87.

It has been found that the apparatus of the present invention is particularly effective in removing water and solid materials from fluids and is particularly suited for use in cleaning oil. Oil from machinery or plant thus may be cleaned using the apparatus of the present invention and reused in the machinery or plant thereby increasing the effective operating life of the machinery and plant.

The apparatus 10 has been shown and described in the embodiments as being a self contained mobile apparatus. The apparatus 10 however may be installed as fixed apparatus for use in any required application.

The apparatus of the present invention whilst using preferably using the particular centrifugal cleaner and vacuum dehydration unit described may use other forms of centrifugal cleaners and dehydration units. In addition, whilst the described modified form of centrifuge 24' is particularly suited to the oil cleaning apparatus described in FIGS. 1 to 4, it may be used in other apparatus for cleaning or purifying liquids. Similarly the described vacuum dehydration apparatus may be used in other applications other than in the described apparatus.

The terms "comprising" or "comprises" or derivatives thereof as used throughout the specification and claims are taken to specify the presence of the stated features, integers and components referred to but not preclude the presence or addition of one or more other feature/s, integer/s, component/s or group thereof.

The above has been given by way of illustrative embodiment of the invention however it is to be understood that the invention is not limited to specific features shown or described. All other modifications or variations to the invention as would be apparent to persons skilled in the art are within the scope of the appended claims.

The invention claimed is:

1. Apparatus for cleaning oil, said apparatus comprising:
   an inlet connectable to a source of oil to be cleaned,
   a holding tank for oil,
   a heating unit for heating said oil,
   a first pump connectable to said inlet or said holding tank for pumping oil to said heating unit,
   a self powered centrifugal cleaner, said centrifugal cleaner having a rotor mounted for rotation about a rotation axis, a housing enclosing the rotor, a cleaner inlet connected to said heating unit for receiving oil from said heating unit and at least one rotor nozzle on the rotor whereby oil exiting in use through said at least one nozzle causes rotation of said rotor about said rotation axis, and a rotatable impeller positioned below the rotor to exert pressure on the oil in said cleaner,
   a vacuum dehydration unit connected to said centrifugal cleaner for receiving oil from said centrifugal cleaner, said dehydration unit comprising a vacuum chamber, and means for connecting said vacuum chamber to a vacuum source for removal of moisture from oil in said vacuum chamber, a vacuum chamber oil outlet,
   a second pump connected to said vacuum chamber oil outlet for pumping oil from said vacuum chamber, and
   first connecting means for selectively connecting said vacuum chamber oil outlet either to an outlet for cleaned oil or to said holding tank for recirculation of cleaned oil back through said apparatus.

2. Apparatus as claimed in claim 1 and including second connecting means for selectively connecting said first pump to either said inlet or said holding tank.

3. Apparatus as claimed in claim 2 wherein said first and second connecting means comprise selectively actuable outlet and inlet valve valves respectively.

4. Apparatus as claimed in claim 1 wherein said centrifugal cleaner comprises a base, a hollow spindle extending from said base along said axis of rotation and connected to said cleaner inlet for supply of oil to the interior of said housing, said rotor being mounted on said spindle for rotation relative to said base, and said housing being mounted on the base.

5. Apparatus as claimed in claim 1 wherein said impeller comprises a central hub mounted for rotation about said axis of rotation of said rotor, said hub having at least one blade extending therefrom.

6. Apparatus as claimed in claim 1 wherein said impeller is attached to said rotor for rotation therewith.

7. Apparatus as claimed in claim 1 wherein said impeller is independent of said rotor.

8. Apparatus as claimed in claim 1 wherein said centrifugal cleaner comprises a base having a drain sump formed therein, said rotor having an interior and an exterior and wherein said axis of rotation comprises a substantially vertical axis for rotation of said rotor thereabout, said at least one rotor nozzle being in a lower portion of the rotor, the rotor having side walls arranged to retain solid contaminants contained in the oil which are forced outwardly by rapid rotation of the rotor due to reaction to ejection of the fluid to said drain sump through the at least one rotor nozzle, said housing mounted on the base, a fluid inlet passage arranged to supply fluid at an elevated pressure to the interior of the rotor by way of the rotation axis, and at least one fluid drain passage in the base to receive fluid from the drain sump.

9. Apparatus as claimed in claim 1 wherein said vacuum chamber has a base, an inlet in an upper portion of the vacuum chamber for fluid entry, and a water trap connected to said chamber for collecting water from said chamber.

10. Apparatus as claimed in claim 9 and including an oil discharge passage in a lower portion of the vacuum chamber and extending a distance above the base of the chamber to maintain a depth of oil in said vacuum chamber.

11. Apparatus as claimed in claim 9 wherein said vacuum chamber includes at least one condensation tray in an upper portion of said chamber to increase the surface area of oil exposed to the vacuum, said condensation tray being inclined downwardly towards the connection of said vacuum source to said vacuum chamber.

12. Apparatus as claimed in claim 1 wherein said centrifugal cleaner includes an outlet, said outlet extending into said vacuum chamber.

13. Apparatus as claimed in claim 1 and including a mobile chassis and wherein said heating unit, centrifugal cleaner, vacuum dehydration unit, and holding tank are supported on said chassis.

14. Apparatus for cleaning oil, said apparatus comprising:
a heating unit for heating oil,
a centrifugal cleaner connected to said heating unit for receiving heated oil from said heating unit, said centrifugal cleaner having a rotor mounted for rotation about a rotation axis, a housing enclosing the rotor, a cleaner inlet for receiving oil from said heating unit, and at least one rotor nozzle on said rotor, said rotor nozzle upon exit of oil therefrom causing rotation of said rotor about said rotation axis, and a rotatable impeller positioned below the rotor to exert pressure on the oil in said cleaner,
a vacuum dehydration unit connected to said centrifugal cleaner for receiving oil from said centrifugal cleaner,
an oil holding tank,
an inlet for oil to be cleaned,
a first control valve selectively actuable to connect said heating unit to one of said inlet or said holding tank whereby oil to be cleaned can be supplied from said inlet to said heating unit or from said holding unit to said heating unit,
an outlet for cleaned oil,
a second control valve selectively actuable to connect said dehydration unit to one of said outlet or said holding tank to supply oil to said outlet or said holding tank respectively, and
one or more pumps for conveying oil from said inlet or holding tank through said heating unit, said centrifugal cleaner and said dehydration unit to said outlet or back to said holding tank.

15. Apparatus for cleaning contaminated oil, said apparatus comprising:
an inlet connectable to a source of oil to be cleaned,
a holding tank for oil,
a heater for heating said oil,
a first pump for pumping oil through said heater,
a centrifugal cleaner having a rotor mounted for rotation about a rotation axis, a housing enclosing the rotor, and a cleaner inlet for receiving oil from said heater,
an impeller attached to said rotor for rotation therewith to exert, when rotated with said rotor, pressure on oil in the cleaner,
a vacuum dehydration unit connected to said centrifugal cleaner for receiving oil from said centrifugal cleaner, said dehydration unit comprising a vacuum chamber, and means for connecting said vacuum chamber to a vacuum source for removal of moisture from said vacuum chamber,
a second pump connected to said vacuum chamber,
an oil outlet,
a selectively actuable outlet valve connected to said second pump and connectable to said holding tank or said oil outlet for pumping of oil to said oil outlet or said holding tank respectively, and
a selectively actuable inlet valve connected to said first pump and connectable to said holding tank or said inlet for pumping oil to be cleaned from said holding tank or said inlet respectively.

16. Apparatus as claimed in claim 15 wherein said centrifugal cleaner comprises a base, a hollow spindle extending from said base along said axis of rotation and connected to said cleaner inlet for supply of oil to the interior of said cleaner, said rotor being mounted on said spindle for rotation relative to said base, said housing being mounted on the base and enclosing the rotor, and at least one rotor nozzle on the rotor, wherein oil exiting in use through said at least one nozzle causes rotation of said rotor about said rotation axis.

17. Apparatus as claimed in claim 16 wherein said rotor has side walls adapted to retain solid contaminants contained in the oil which are forced outwardly by rotation of the rotor.

18. Apparatus as claimed in claim 17 wherein said vacuum chamber least one condensation tray in an upper portion of said chamber to increase the surface area of oil exposed to the vacuum, said condensation tray being inclined downwardly towards the connection of said vacuum source to said vacuum chamber.

19. Apparatus as claimed in claim 18 and including and a water trap connected to said chamber for collecting water condensing within said chamber.

* * * * *

UNITED STATES PATENT AND TRADEMARK OFFICE
CERTIFICATE OF CORRECTION

| | |
|---|---|
| PATENT NO. | : 7,407,474 B2 |
| APPLICATION NO. | : 10/533403 |
| DATED | : August 5, 2008 |
| INVENTOR(S) | : Smith |

It is certified that error appears in the above-identified patent and that said Letters Patent is hereby corrected as shown below:

In column 13, line 19, "holding unit" should read -- holding tank --.

Signed and Sealed this

Tenth Day of February, 2009

JOHN DOLL
*Acting Director of the United States Patent and Trademark Office*